Nov. 24, 1953

P. C. PATIN 2,660,073

PROGRESSIVE CHANGE-SPEED GEAR

Filed Jan. 12, 1951

INVENTOR
PIERRE CHARLES PATIN

By:
Haseltine, Lake & Co.
AGENTS

UNITED STATES PATENT OFFICE 2,660,073

PROGRESSIVE CHANGE-SPEED GEAR

Pierre Charles Patin, Paris, France

Application January 12, 1951, Serial No. 205,791
Claims priority, application France
January 23, 1950

8 Claims. (Cl. 74—691)

My invention has for its object a mechanical arrangement adapted to transform a rotary constant speed movement into another rotary movement coaxial with the former and the speed of which is capable of varying continuously between two values to either side of zero speed. Such an arrangement forms a progressive change speed gear the range of speed of which extends in a continuous manner between a positive value and a negative value so as to allow the passage in a continuous manner and without any slip from stationary conditions to a rotary movement of the secondary shaft.

For this purpose, the progressive change speed gear, according to my invention, includes two primary coaxial shafts of which one carries planet wheels adapted to roll over a sunwheel rigid with the other primary shaft, said primary shafts assuming speeds of predetermined values in a given direction, the ratio between said speeds being invariable; the planet wheels are on the other hand carried by an arrangement for shifting them with reference to the primary sunwheel, and they drive along with them an internal ring gear rigid with the secondary shaft. The modification in position of the planet wheels provides means for modifying the direction and value of the speed of the secondary shaft which latter may assume inter alia the value zero.

According to a further feature of my invention, the transmission of power between the primary sunwheel, the primary planet wheels and the secondary internal ring gear is performed through frictional contact, the primary sunwheel, the primary planet wheels and the secondary internal ring gear being replaced by friction wheels.

According to a preferred embodiment of the invention, the primary friction sunwheel and the secondary friction sunwheel may be constituted each by a surface of revolution, the meridian lines of which are tangent to the circles of constant radius forming a same family of circles, said constant radius corresponding to the radius of the planet friction wheels housed between said surfaces of revolution, which planet friction wheels are submitted to a displacement such that their equatorial planes remain perpendicular to said meridian lines.

Thus, the primary friction sunwheel and the secondary friction sunwheel may be formed by concave toroidal surfaces between which roll planet friction wheels or rollers the equatorial plane of which is adapted to pivot round an axis tangent to the circle forming the directing line of the toroidal space thus defined.

I have disclosed in the following description and illustrated in accompanyng drawings embodiments of my invention selected by way of a mere exemplification and adapted to make the principle of my invention readily understandable.

Figure 1:
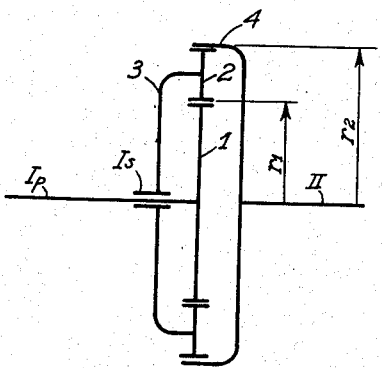
Fig. 1 is a diagrammatic showing of a transmission system according to the invention, without any modification in speed being provided.

Turning to the diagram of Fig. 1, an epicyclic gear constituted by a sunwheel 1 connected with the primary shaft $Ip$ and planet wheels 3 carried by the planet carrier 2 connected with the shaft $Is$ coaxial with said shaft $Ip$ drives an internal ring gear 4 connected with the secondary shaft $II$. Hereinafter, the main shaft $Ip$ will be termed the primary sunwheel shaft and the coaxial shaft $Is$ the primary planet shaft.

If it is assumed that the primary sunwheel shaft $Ip$ rotates with an angular speed $w$, there exists for the primary planet shaft $Is$ a speed $w'=K.w$ such that the internal ring gear 4 remains stationary.

It is, furthermore, easy to define this value K as a function of the radii of the internal ring gear and of the primary sunwheel. As a matter of fact, if $r_1$ is the radius of the primary sunwheel and $r_2$ the radius of the internal ring gear, it is sufficient to write down that the elementary arcs corresponding to a small rotation of the sunwheel and of the planet wheels are equal, the centers of instantaneous rotation being the axis of the primary shaft for the sunwheel and the point of contact with the internal ring gear for the planet wheel.

The elementary arc is $wr_1 dt$ for the primary sunwheel and, for the planet pinion, the elementary arc is equal to twice the displacement of its center which is equal to:

$$w'\frac{r_1+r_2}{2}dt$$

or $$Kw\frac{r_1+r_2}{2}dt$$

The elementary arc is therefore equal to $Kw(r_1+r_2)dt$ and consequently $$Kw(r_1+r_2)dt = wr_1 dt$$

and therefore $$K = \frac{r_1}{r_1+r_2}$$

Supposing $$\lambda = \frac{r_1}{r_2}$$

K is equal to $$\frac{\lambda}{\lambda+1}$$

which condition expresses the ratio E between the speeds $w'$ and $w$ for which the internal ring gear is stationary, the ratio $\lambda$ between the radii $r_1$ and $r_2$ assuming a predetermined value.

If it is now supposed that the primary sunwheel shaft $Ip$ and the primary planet shaft $Is$ are carried along at speeds $w$ and $w' = Kw$ as defined hereinabove, and furthermore, if it is supposed that it is possible to make the ratio $\lambda$ between the radii of the primary sunwheel shaft and of the secondary planet shaft vary continuously while retaining a constant value for the radius of the planet pinions, then under such conditions the equality $$K = \frac{\lambda}{\lambda+1}$$

that expresses the immobility of the internal ring gear, is no longer true as $\lambda$ varies, so that said internal ring gear starts rotating. It is possible, furthermore, to calculate its speed as a function of $\lambda$. In fact, if the whole system is supposed to rotate at a speed $$-w' = -Kw$$

in other words, if the primary planet pinion shaft is stationary in space, the primary sunwheel rotates at a speed $$w - Kw = w(1-K)$$

the speed of the internal ring gear is then equal to $$-\frac{r_2}{r_1}w(1-K)$$

or $$-\lambda w(1-K)$$

Turning back to the actual original speeds by giving the whole system a speed $Kw$, the speed of the internal ring gear is $$\Omega = Kw - \lambda w(1-K)$$
$$\Omega = w[K - \lambda(1-K)]$$

The amount between square brackets is the speed reduction:

$$D = K - \lambda(1-K)$$

This leads back to the condition:

$$K - \lambda(1-K) = 0$$

or $$K = \frac{\lambda}{\lambda+1}$$

which expresses the fact of the internal ring gear being stationary. If K is predetermined as a stationary ratio, in accordance with the general conditions of operation, the equality $$K - \lambda(1-K) = 0$$

defines a value of $\lambda$ as a function of K $$\lambda = \frac{K}{1-K}$$

When $\lambda$ varies to either side of this value, the speed reduction becomes positive or negative and the internal ring gear may assume positive or negative speeds; in particular, if $\lambda$ varies continuously between a value above $$\frac{K}{1-K}$$

and a value below $$\frac{K}{1-K}$$

the speed of the internal ring gear varies between a negative value and a positive value and passes, of course, through a zero value.

It will be noticed that in the preceding disclosure, only the ratio between the radii $r_1$ and $r_2$ of the primary sunwheel and the internal ring gear is considered. Now it is possible to modify this ratio by resorting to a progressive change speed gear wherein the transmission of the stresses is performed through frictional contact.

Figure 2:
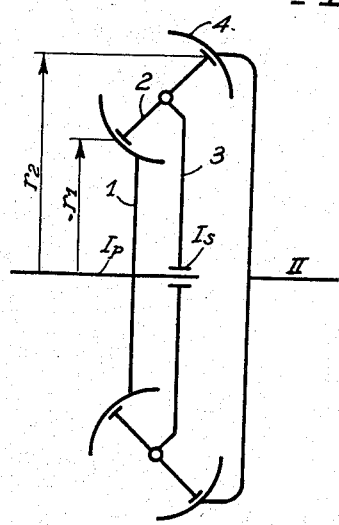
Fig. 2 is a diagrammatic view of a change speed gear according to the invention.
Figure 3:
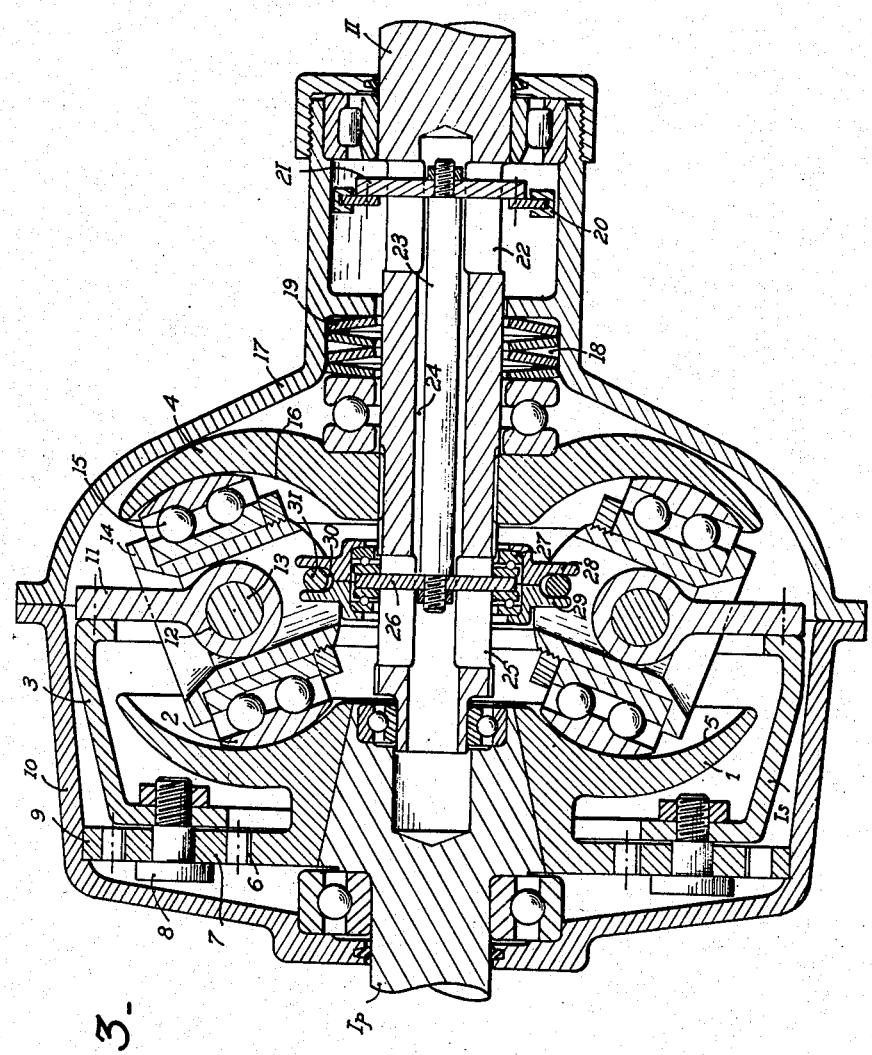
Fig. 3 is an axial cross section of an embodiment of a change speed gear the diagrammatic illustration of which is that appearing in Fig. 2.

Figs. 2 and 3 relate to an embodiment of such a progressive change speed gear operating through frictional contact.

To the primary friction sunwheel shaft $Ip$ is secured a sunwheel 1 provided with a concave toroidal surface along its periphery at 5; the friction sunwheel is, furthermore, rigid with an outer series of teeth 6 meshing with planet pinions 7 revolubly carried by spindles 8 secured to a primary planet carrier 3. The planet pinions 7 roll also on an internally toothed ring gear 9 carried by the general casing 10 of the arrangement which is fixed from rotation.

The planet carrier 3 is provided with a plurality of supporting members 11. Each supporting member 11 is formed with an eye or bore 12 carrying a spindle 13 on which is secured a socket 14 that is thus adapted to rock round the axis of the bore 12. Said socket carries in its turn a planet roller 2 revolubly secured to said socket through the agency of a ball bearing 15 and frictionally engaging the concave toroidal surface 5 of the friction sunwheel 1.

Each planet roller 2 is, furthermore, in contacting relationship with the concave toroidal surface 16 of a secondary friction sunwheel 4 that is rigid wtih the secondary shaft II. The casing 10 is closed by a cover 17 providing a recess 18 to the rear of the secondary friction sunwheel 4, said recess enclosing an elastic system constituted by Belleville washers 19 adapted to provide friction between the concave toroidal surfaces 5 and 16 on one hand and the rollers 2 between same on the other.

The cover 17 is provided with a slot that is not shown and through which passes a control fork 20 rigid with a plate 21 passing through a slot 22 formed longitudinally in the secondary shaft II. The plate 21 is, furthermore, rigid with a control spindle 23 adapted to slide in the longitudinal bore 24 of the secondary shaft. The spindle 23 has its end registering with a second longitudinal slot 25 formed in the secondary shaft and carries on said end a small plate 26 held with the interposition of ball bearings 27 between the two plates 28 and 29 the outer surfaces of which define an outer groove 30 engaging studs 31 rigid with the corresponding above mentioned sockets 14. Through actuation of the control fork 20, the studs 31 are carried along by the plates 28 and 29, which leads to a modification in the location of the planet rollers 2 with reference to the concave toroidal surfaces 5 and 16. This shifting leads to a modification in the radii $r_1$ and $r_2$ and consequently in the ratio $\lambda$. It is, therefore, possible to make the speed of the secondary shaft II vary between a negative and a positive value, said range of speeds passing in particular through the value zero.

Obviously, it is possible, without unduly widening the scope of the invention as defined in accompanying claims to bring various modifications to the embodiments described. In practice, the elastic means provided inside the recess 18 may be of any type whatever.

What I claim is:

1. A progressive change speed gear comprising a primary shaft, a friction sunwheel rigid with said shaft, a planet pinion carrier coaxial therewith, means whereby said planet pinion carrier and primary sunwheel shaft revolve coaxially at speeds assuming a constant ratio with one another, a plurality of planet friction wheels revolubly carried by the said planet carrier, and forming a ring shaped system round the axis of the primary shaft, a second friction sunwheel, a secondary output shaft aligned with the primary shaft and operatively connected with said second friction sunwheel, the planet friction wheels engaging simultaneously through frictional contact both friction sunwheels along annular lines of engagement coaxial with the primary and secondary shafts and means for shifting the planet friction wheels with reference to their carrier to modify as desired the radii of said annular lines.

2. A progressive change speed gear comprising a primary shaft, a friction sunwheel rigid with said shaft, a planet pinion carrier coaxial therewith, means whereby said planet pinion carrier and primary sunwheel shaft revolve coaxially at speeds assuming a constant ratio with one another, a plurality of planet friction wheels revolubly carried by the said planet carrier, assuming at their periphery a shape of revolution to engage through frictional contact the friction sunwheel and forming a ring-shaped system round the axis of the primary shaft, a second sunwheel frictionally engaging said planet friction wheels of revolution, a secondary output shaft aligned with the primary shaft and operatively connected with said second friction sunwheel, the two friction sunwheels being constituted by similar bodies of revolution the meridian lines of which are tangent to a plurality of circles of constant radius lying in the same meridian planes and corresponding geometrically to the possible locations of the circular meridian lines of the planet friction wheels the equatorial planes of which are perpendicular to the meridian planes considered, and means for shifting the planet friction wheels with reference to their carrier to shift the locations of their circular meridian lines in the corresponding meridian planes of the friction sunwheels and thereby to modify the speed relationship between the sunwheels.

3. A progressive change speed gear comprising a primary shaft, a friction sunwheel rigid with said shaft, a planet pinion carrier coaxial therewith, means whereby said planet pinion carrier and primary sunwheel shaft revolve coaxially at speeds assuming a constant ratio with one another, a plurality of planet friction wheels revolubly carried by the said planet carrier, assuming at their periphery a shape of revolution to engage through frictional contact the friction sunwheel, and forming a ring shaped system round the axis of the primary shaft, a second sunwheel frictionally engaging said planet friction wheels of revolution, a secondary output shaft aligned with the primary shaft and operatively connected with said second friction sunwheel, the two friction sunwheels having concave toroidal recesses coaxial therewith for their frictional engagement with the planet friction wheels along annular lines lying at adjustable radial distances from the axis of the friction sunwheels, the equatorial planes of the planet friction wheels being perpendicular to the meridian planes of the friction sunwheels passing through their points of contact therewith, and means for shifting the planet friction wheels with reference to their carrier to modify as desired the radii of said annular lines.

4. A progressive change speed gear comprising a primary shaft, a friction sunwheel rigid with said shaft, a planet pinion carrier coaxial therewith, a plurality of inwardly directed radial projections on said carrier, a sleeve revolubly mounted at the end of each radial projection with its axis lying in a plane passing through the shaft axis and adapted to rock round an axis perpendicular to said plane, the rocking axes for the different sleeves lying at a same distance from the shaft axis, means whereby said planet pinion carrier and primary sunwheel shaft revolve coaxially at speeds assuming a constant ratio with one another, a plurality of planet friction wheels revolubly carried by the carrier sleeves and forming a ring-shaped system round the axis of the primary shaft, a second friction sunwheel, a secondary output shaft aligned with the primary shaft and operatively connected with said second friction sunwheel, the planet friction wheels frictionally engaging simultaneously both friction sunwheels along annular lines of contacts coaxial with the primary and secondary shafts, and means for shifting the planet wheel sleeves with reference to their carrier to modify as desired the radii of said annular lines.

5. A progressive change speed gear comprising a primary shaft, a friction sunwheel rigid with said shaft, a planet pinion carrier coaxial therewith, a plurality of inwardly directed radial projections on said carrier, a sleeve revolubly mounted at the end of each radial projections with its axis lying in a plane passing through the shaft axis and adapted to rock round an axis perpendicular to said plane, the rocking axes for the different sleeves lying at a same distance from the shaft axis, means whereby said planet pinion carrier and primary sunwheel shaft revolve coaxially at speeds assuming a constant ratio with one another, a plurality of planet friction wheels revolubly carried by the carrier sleeves and forming a ring shaped system round the axis of the primary shaft, a second friction sunwheel, a secondary output shaft aligned with the primary shaft and operatively connected with said second friction sunwheel, the planet friction wheels frictionally engaging simultaneously both friction sunwheels along annular lines of contacts coaxial with the primary and secondary shafts, a member slidingly carried by the secondary sunwheel shaft and including a plurality of grooved members at its outer periphery, a stud carried by each sleeve and engaged by the corresponding grooved member and means operable from the outside of the change speed gear for shifting longitudinally over the secondary shaft the sliding member to constrain said grooved members to shift the corresponding studs into positions providing predetermined angular shifted positions for the planet wheel and sleeve arrangements and a consequent modification in the radial distances of the points of the annular lines of contact.

6. A progressive change speed gear comprising a primary shaft, a friction sunwheel rigid with said shaft, a planet pinion carrier coaxial therewith, means whereby said planet pinion carrier and primary sunwheel shaft revolve coaxially at speeds assuming a constant ratio with one another, a plurality of planet friction wheels revolubly carried by the said planet carrier and forming a ring-shaped system round the axis of the primary shaft, a second friction sunwheel, a secondary output shaft aligned with the primary shaft and operatively connected with said second friction sunwheel, the planet friction wheels frictionally engaging simultaneously both friction sunwheels along annular lines of contact coaxial with the primary and secondary shafts, and means for shifting the planet friction wheels with reference to their carrier to modify as desired the radii of said annular lines, a casing surrounding the friction sunwheels, planet friction wheels and planet carrier and revolubly carrying the primary and the secondary shaft, and elastic means engaging the casing and urging the secondary friction sunwheel longitudinally of its shaft to exert a pressure on the planet friction wheels and therethrough on the first sunwheel.

7. A progressive change speed gear comprising a primary shaft, a friction sunwheel rigid with said shaft, a planet pinion carrier, surrounding the periphery of said friction sunwheel, a plurality of planet toothed pinions revolubly carried by said carrier lying in a plane perpendicular to the axis of the shaft and revolving round axes parallel with said shaft and forming an annular system coaxially surrounding same, a toothed sunwheel coaxial with the shaft axis, rigid with the friction sunwheel and operatively engaging said pinions, a casing body surrounding the sunwheel revolubly carrying the friction sunwheel shaft and carrying an internal ring gear coaxial with the shaft axis and operatively engaging the pinions, a second shaft coaxial with the first shaft, a second friction sunwheel driven into rotation by said planet pinions and facing the first friction sunwheel, the two friction sunwheels having two arcuate concave frictional surfaces of revolution facing one another, a plurality of radial inwardly directed projections rigid with the carrier and provided with pivotal surfaces the axes of which are perpendicular to the corresponding meridian planes and lie all at the same distance from the shaft axis, sleeves rockably carried by said pivotal surfaces and the axes of which lie in the corresponding meridian planes, planet friction wheels revolubly carried by said sleeves and frictionally engaging the arcuate surfaces of the friction sunwheels along an annular line thereon lying coaxially with the shaft axis and means operable from the outside for rocking the different sleeves simultaneously round the pivotal surfaces to engage the planet friction wheels with the corresponding arcuate surfaces of both friction sunwheels along annular lines of engagement at different distances from the shaft axis.

8. A progressive change speed gear comprising a primary shaft, a friction sunwheel rigid with said shaft, a planet pinion carrier, surrounding the periphery of said sunwheel, a plurality of planet toothed pinions revolubly carried by said carrier lying in a plane perpendicular to the axis of the shaft and revolving round axes parallel with said shaft and forming an annular system coaxially surrounding same, a toothed sunwheel coaxial with the shaft axis rigid with the friction sunwheel and operatively engaging said pinions, a casing body surrounding the friction sunwheel, revolubly carrying the sunwheel shaft and carrying an internal ring gear coaxial with the shaft axis and operatively engaging the pinions, a second shaft coaxial with the first shaft, a second friction sunwheel driven into rotation by said planet pinions and facing the first friction sunwheel, the two friction sunwheels having two arcuate concave frictional surfaces of revolution facing one another, a plurality of radial inwardly directed projections rigid with the carrier and provided with pivotal surfaces the axes of which are perpendicular to the corresponding meridian planes and lie all at the same distance from the shaft axis, sleeves rockably carried by said pivotal surfaces and the axes of which lie in the corresponding meridian planes, planet friction wheels revolubly carried by said sleeves and frictionally engaging the arcuate surfaces of the friction sunwheels along an annular line thereon lying coaxially with the shaft axis and means operable from the outside for rocking the different sleeves simultaneously round the pivotal surfaces to engage the planet friction wheels with the corresponding arcuate surfaces of both friction sunwheels along annular lines of engagement at different distances from the shaft axis, a casing element secured to the first casing body and carrying revolubly the second shaft and elastic means inserted between said casing element and the second sunwheel to urge the latter towards the planet friction wheels and the first friction sunwheel.

PIERRE CHARLES PATIN.

References Cited in the file of this patent

UNITED STATES PATENTS

| Number | Name | Date |
| --- | --- | --- |
| 766,757 | Crane | Sept. 2, 1904 |
| 1,770,408 | Jacobsen | July 7, 1930 |
| 1,800,388 | Jacobsen | Apr. 14, 1931 |
| 1,978,439 | Sharpe | Oct. 30, 1934 |

FOREIGN PATENTS

| Number | Country | Date |
| --- | --- | --- |
| 24,140 | Great Britain | Oct. 31, 1911 |
| 410,138 | Germany | Feb. 24, 1925 |
| 551,390 | Germany | May 30, 1932 |
| 577,118 | Germany | May 24, 1933 |
| 295,535 | Italy | Apr. 23, 1932 |